(12) United States Patent
Tam

(10) Patent No.: US 6,351,617 B1
(45) Date of Patent: Feb. 26, 2002

(54) METHOD AND APPARATUS FOR FORMING SINGLE-EXPOSURE SYNTHESIZED IMAGES

(76) Inventor: Wai-Man Tam, 22C, Max Share Center, 367 King's Road, North Point (HK)

(*) Notice: Subject to any disclaimer, the term of this patent is extended or adjusted under 35 U.S.C. 154(b) by 0 days.

(21) Appl. No.: 09/478,208

(22) Filed: Jan. 5, 2000

(51) Int. Cl.$^7$ .................. G03B 41/00; G03B 27/32; G03B 27/70

(52) U.S. Cl. .................. 396/332; 396/322; 396/544; 355/43; 355/66

(58) Field of Search .................. 396/322, 332, 396/544; 355/40, 43, 66

(56) References Cited

U.S. PATENT DOCUMENTS

| | | | | |
|---|---|---|---|---|
| 3,628,430 A | * | 12/1971 | Morse | 396/544 |
| 4,350,419 A | * | 9/1982 | Bowen | 396/322 |
| 5,006,885 A | * | 4/1991 | Greenspan | 355/43 |
| 5,819,123 A | * | 10/1998 | Watanabe | 396/332 |
| 5,897,231 A | * | 4/1999 | Gatti | 396/332 |

* cited by examiner

*Primary Examiner*—Alan A. Mathews
(74) *Attorney, Agent, or Firm*—Rosenberg, Klein & Lee

(57) ABSTRACT

A method and apparatus for forming a single-exposure synthesized image on film is provided where an instantaneous image is combined with an image from a prepared picture on film. The preparation picture is reflected by a reflective mirror, and then is refracted by the objective lens of the camera to form a prepared image. The reflective mirror has a central hole that is located in front of the objective lens. The prepared picture also has a central hole, or a central transparent portion, and is located in a space between the objective lens and the reflective mirror, so that the reflecting surface of the reflective mirror faces the picture and the objective lens. Light rays from the prepared picture are reflected by the reflective mirror, pass through the central hole or the central transparent portion of the picture and through the objective lens to image the prepared picture image on the circumferential portion of the film. The light rays from the subject being photographed pass through the central of the reflective mirror, and the central hole or the central transparent portion of the prepared picture, and the objective lens to form an image on a central portion of the film. A synthesized image is thus composed.

16 Claims, 7 Drawing Sheets

METHOD AND APPARATUS FOR FORMING SINGLE-EXPOSURE SYNTHESIZED IMAGES

BACKGROUND OF THE INVENTION

1. Field of the Invention

The present invention relates to the field of modern photography, and more particularly to a method and apparatus for single-exposure synthesizing of images on films.

2. Prior Art

Along with scientific development, photographic technology has improved greatly, and the expectation of people, with respect to photograph effects, has improved too. With regard to the synthesized image composing of two images (one prepared image and one instantaneous image) on the same film, such has found favor with a lot of people. This is because it can improve the artistic quality, the memory quality (the impression that it leaves with those who view it), the advertisement quality, and improves the appearance of the resulting image(s).

The conventional method for single-exposure synthesizing of an image is shown on FIG. 1, in which the objective lens 1 represents the objective system of the camera. A bicurvature lens 2, having a flat center portion that conducts the light rays from the instantaneous image through it, is set at the front of the objective lens 1. The circumference portion of the bicurvature lens surrounding the flat center portion is a lens with a certain focal length, to thereby refract the prepared picture 3 light rays so as to project them onto the circumference portion of the film 4, via the objective lens 1, to generate a copy of the prepared image. Meanwhile, the light rays of the outside instantaneous image pass through the central hole 31 of the prepared picture 3, the flat center portion of the bicurvature lens 2 and the objective lens 1 to project onto the central portion of the film 4 to generate a copy of the instantaneous image. Thus, a synthesized image is composed on the film 4.

After studying the above-described method, it is not difficult to find that it has some shortcomings.

1. For obtaining a clear synthesized image composed from a prepared picture and an instantaneous image on the film 4, the bicurvature lens 2 is designed to attach on the front of the objective lens 1 of the camera so that the composing lens becomes a bifocal lens. The light rays from the instantaneous image are cast onto the center of the film 4 via the flat center portion of the bicurvature lens 2. But, if the flat center portion is displaced slightly in a radial direction, it will affect the resolution of the composed picture, as the prepared picture light rays will not be cast onto the circumferential portion of the film 4 exactly as originally expected by the designer. Some of that image will be diffused across the objective lens 1 onto the center portion of the film 4, through the flat center portion of the bicurvature lens 2, unnecessarily scattering light to disturb the instantaneous image at the center portion of the film 4. As shown on FIG. 1, the point A of the prepared picture would be expected to be copied on point A' of the film 4 via the objective lens 1 by the bicurvature lens 2. But, it actually is diffused somewhere at the center portion of the film 4, like B' or C', through the center of the objective lens 1 to cause a fuzzy image.

2. Due to the differences in curvature of the center portion and the circumferential portion of the bicurvature lens 2, and the high degree of concentricity required, the manufacturing of the bicurvature lens 2 becomes very difficult, so that the production cost of the device is very high.

3. With respect to the composing image technology, the principal axis of the bicurvature lens 2 must be maintained coincident with the principal axis of the objective lens 1, thereby demanding a very critical assembling technique requiring a high degree of expertise and a high accuracy of location, so as to further increase the production costs.

4. Because various models of cameras each have different objective lens with different focal distance, each different objective lens 1 requires a different size of bicurvature lens 2. Hence, one size of the dual-duty synthesized image attachment may suit only one model of camera, providing little or no versatility.

OBJECTS AND SUMMARY OF THE INVENTION

It is therefore a main object of the present invention to provide a method for forming single-exposure synthesized images that can shoot a clear and high resolution synthesized picture.

It is another object of the present invention to provide an apparatus for forming a single-exposure synthesized image designed according to the above-referenced method, that can be manufactured at a low production cost, and assembled easily, and easily attached on any model of camera.

For archiving those objects, the present invention locates a reflective mirror having a central hole in front of the objective lens, and a prepared picture, also having a central hole or a transparent central portion, located at a proper position between the reflective mirror and the objective lens. Wherein, the reflecting side of the reflective mirror faces toward the picture and the objective lens, so that the light rays from the prepared picture can be reflected to the circumferential portion of the film, to form the image expected from the prepared picture via the objective lens. Meanwhile, the image light rays from the subject being photographed pass through the center hole of the reflective mirror, the central hole or the central transparent portion of the preparation picture and the objective lens to generate an image on the central portion of the film.

In the above-mentioned method, the principal axis of the reflective mirror has to coincide with the principal axis of the objective lens. The prepared picture has to be located at the principal focus of the reflective mirror, and substantially perpendicular to the principal axis of the reflective mirror.

The center point of the central hole or the central transparent portion of the preparation picture and the center point of the central hole of the reflective mirror have to be on the principal axis of the objective lens.

For achieving the method for forming a single-exposure synthesized image, the corresponding apparatus includes a prepared picture having a central hole or a central transparent portion, and a reflective mirror having a central hole. The reflective mirror is located in the front of the prepared picture with the reflecting surface facing the picture. The prepared picture is located at the proper position between the objective lens and the reflective mirror. The prepared picture and the reflective mirror are integrated into an attaching box.

In the apparatus, the reflective mirror can be either a spherical mirror or a non-spherical mirror.

The central hole or the central transparent portion of the prepared picture is the same as the central hole of the reflective mirror in the shape, and proportion. The box is composed of transparent plates.

When a photograph is taken by pressing the shutter release down, the light rays from the prepared picture generate a virtual image on the reflective mirror. The virtual image surrounding the central hole of the mirror is projected onto a circumferential portion of the film to appear as the prepared picture thereon. Meanwhile, the light rays from the subject being photographed pass through the central hole of the reflective mirror and the central hole or the central transparent portion of the prepared picture to be imaged on the central portion of the film via the objective lens, thereby composing a synthesized image.

This invention has advantages when compared with the prior art as follows:

1. The method of photographing with the present invention is the same as the common photographic method. The prepared picture is imaged on the reflecting surface of the reflective mirror to form a virtual image surrounding the image of the subject being photographed, and they are projected onto the same film with the same objective lens, same shutter and same aperture to image a clear picture with high resolution and a good image effect. The central hole acts as a field stop to restrict the range of instantaneous image (that which is being photographed) in size and shape.

2. The present invention does not need attachment to a pre-exposure system and an additional refracting system (like a bicurvature lens), and does not require a change to the inside construction of the camera. It is a feature of the present invention to be a simple structure, easily located, convenient in operation, and have a low production cost.

3. Due to the inclusion of a transparent box, the outside light can pass through the box to light the prepared picture. The prepared picture and the reflective mirror are fixed to the box. The relative positions of the prepared picture and the mirror are fixed too, so that the user can change the picture at will.

4. The individual apparatus can attach on any model of camera without limitation, as the distance to the objective lens will not substantially affect the resolution and enlarging power.

DETAILED DESCRIPTION OF PREFERRED EMBODIMENTS

Figure 1:
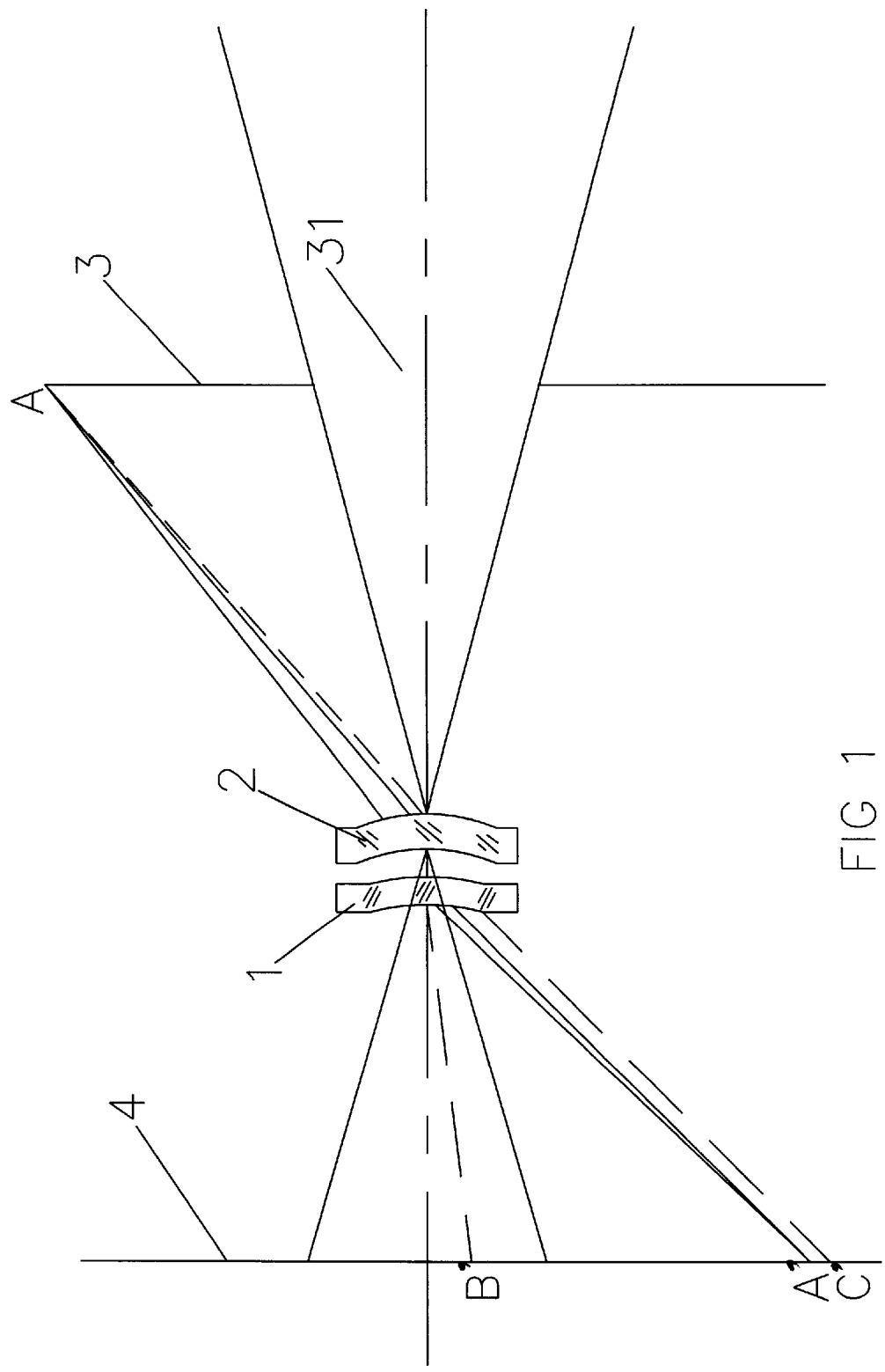
FIG. 1 is an optical schematic diagram of the prior art.
Figure 2:
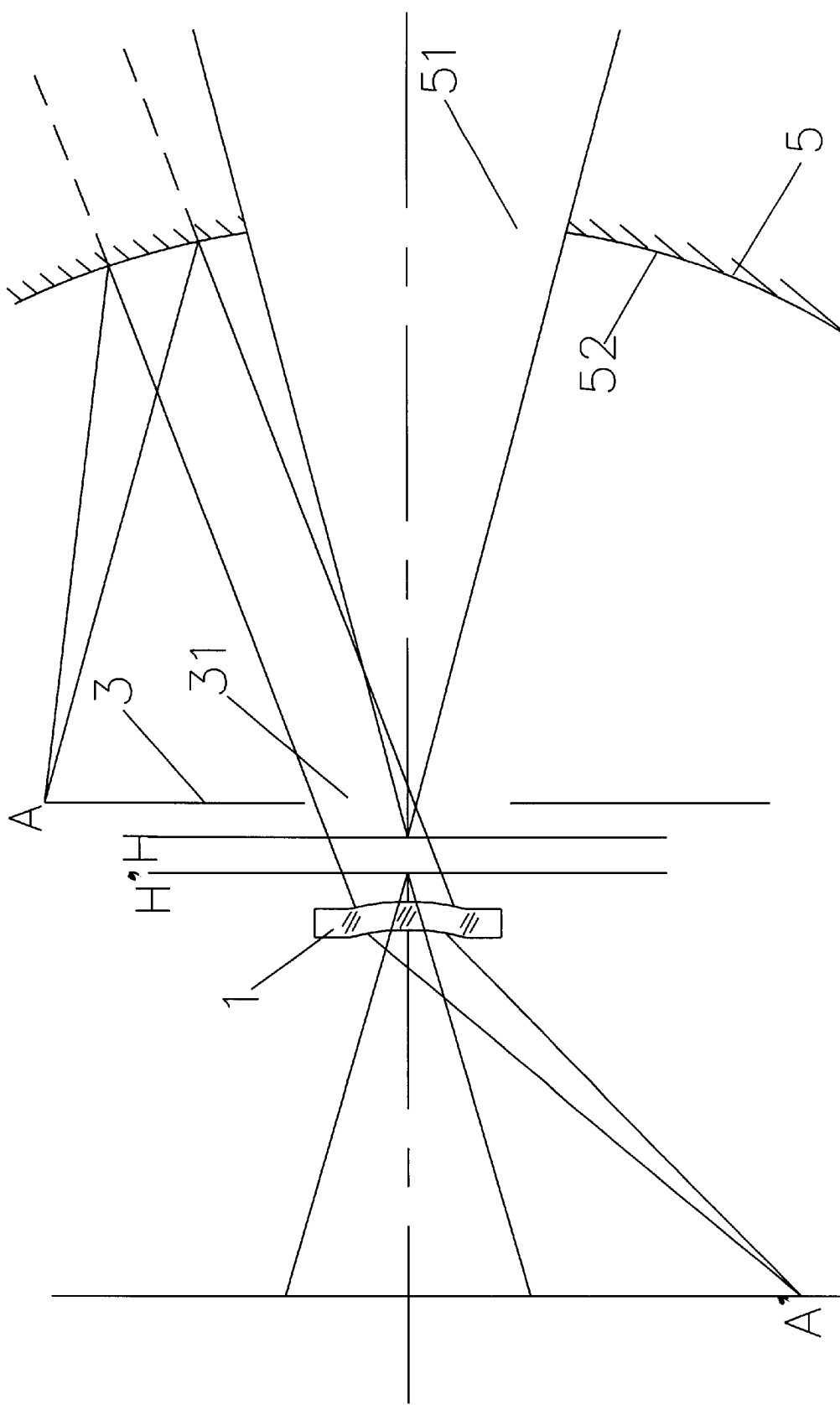
FIG. 2 is an optical schematic diagram of the present invention.

Referring to FIG. 2, the present invention provides a method for forming a single-exposure synthesized image on films, so that the real view or instantaneous image, the instantaneous or real view image being the image of the subject being photographed, is imaged directly by means of refracting of the objective lens 1, and the range of the instantaneous image is restricted by the central hole 51 of the reflecting mirror 5. The prepared picture 3 is reflected by the reflective mirror 5, then refracted by the objective lens 1 to focus the prepared image on the film. The reflective mirror 5 with a central hole 51 is placed on the front of the prepared picture 3 with a central hole or a central transparent portion 31, the reflecting surface 52 faces toward the prepared picture 3, the other side of the prepared picture 3 faces the objective lens 1, so that the prepared picture 3 is placed between the objective lens 1 and the reflective mirror 5. The prepared picture 3 is reflected by the reflecting surface 52 of the reflective mirror 5 via the central hole or the central transparent portion 31 and the objective lens 1 onto the circumferential portion of the film 4 to form an image of the prepared picture 3. From another aspect, it can be comprehended that the light rays from the prepared picture 3 generate a virtual image with respect to the reflecting surface 52 of the reflective mirror 5 surrounding the central hole 52, then it is refracted onto a circumferential portion of the film 4 by the objective lens 1 to form an image of the prepared picture. The light rays from the subject being photographed pass through the central hole 51 of the reflective mirror 5, the central hole or the central transparent portion 31 of the prepared picture 3 and the objective lens 1 to form an image on the central portion of the film 4, so a synthesized image is thereby composed on a single frame of film, as shown on FIG. 2. The point A on the prepared picture is cast on the reflective mirror 5, as shown by two lines in the drawing. Then, the light rays are refracted by the objective lens 1 to image point A' on the film 4. It can be comprehended that the virtual image of the point A formed with respect to the reflecting surface 52 of the reflective mirror 5 is focused by the camera, combining that image with the image of the subject being photographed, to compose a synthesized image on the film through the objective lens 1.

Figure 3:
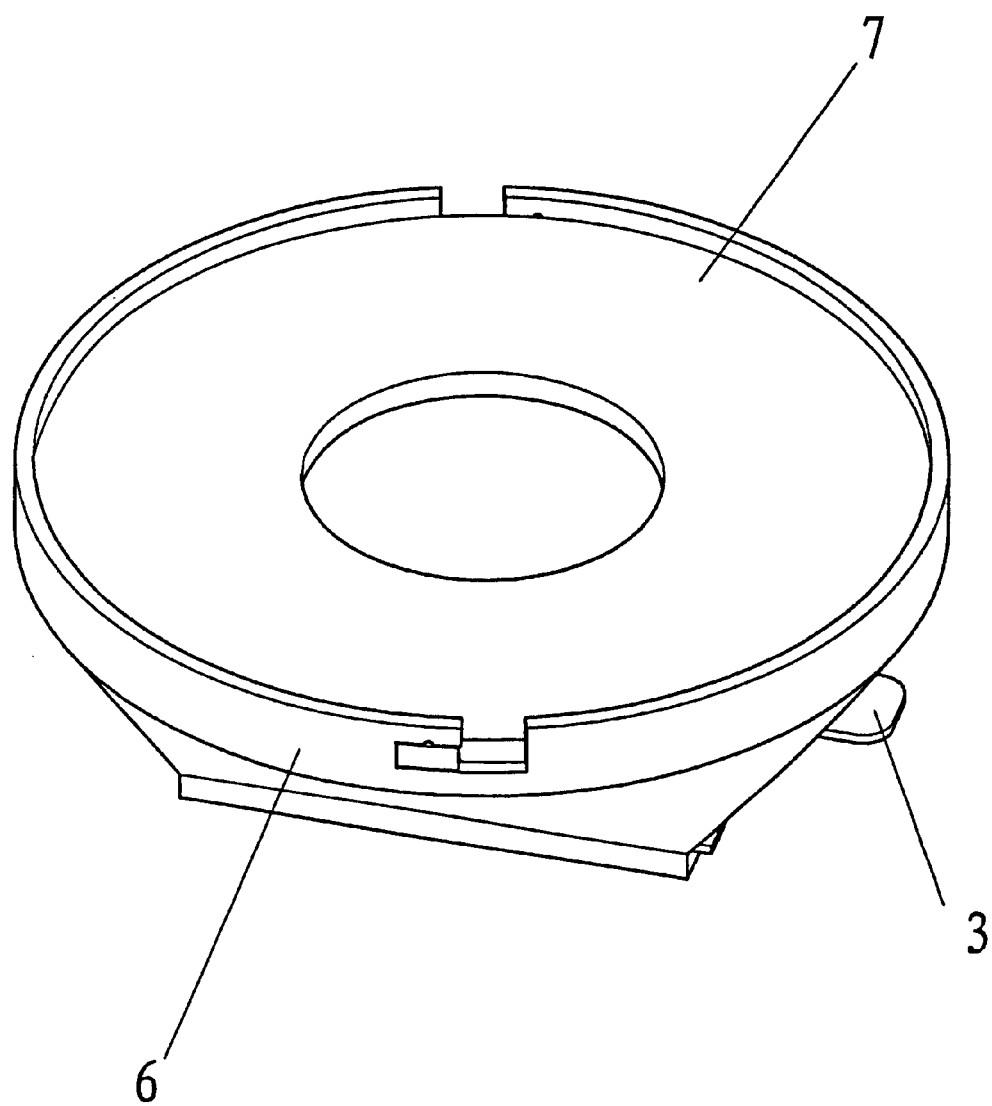
FIG. 3 is a perspective view showing an operation of the present invention.
Figure 4:
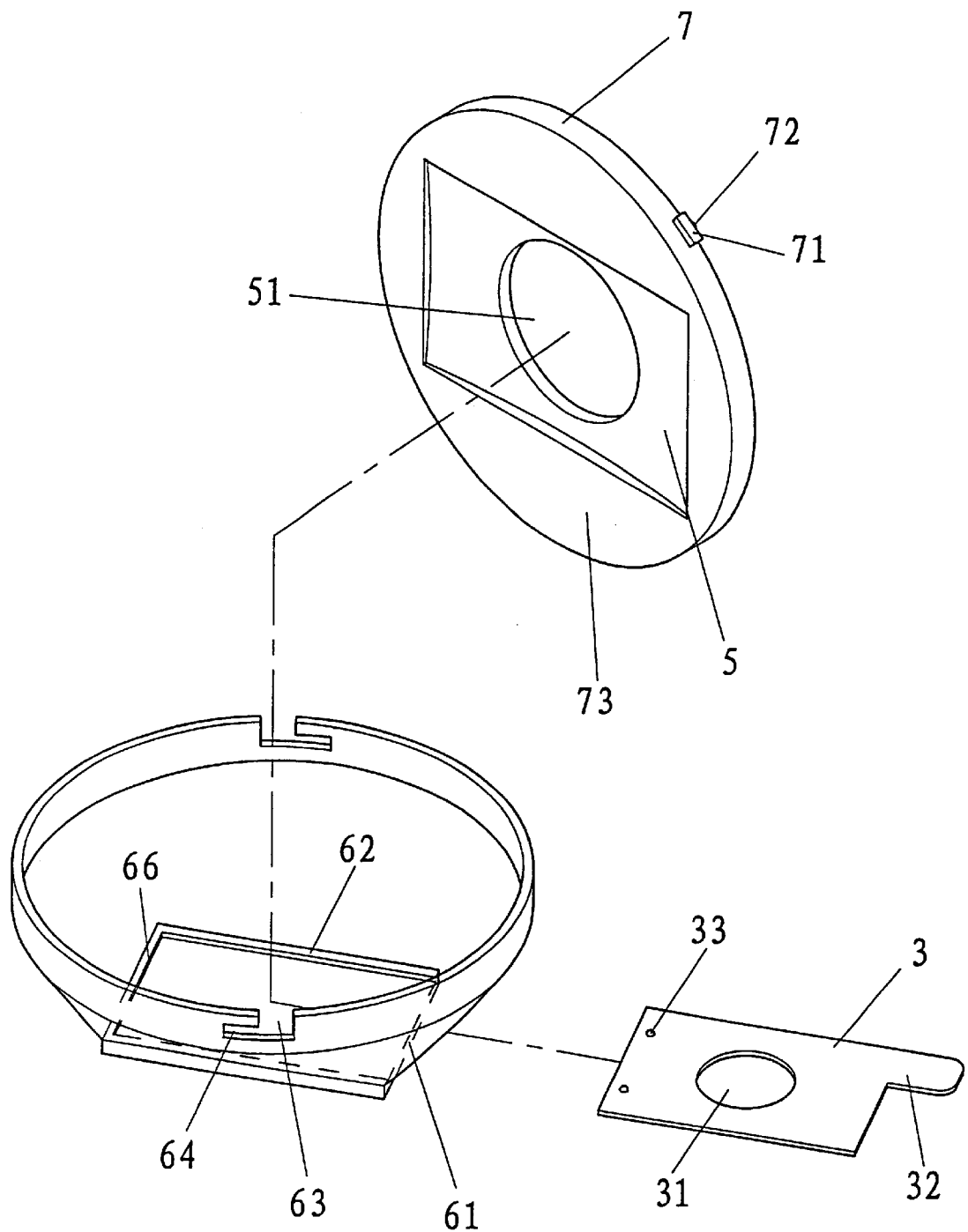
FIG. 4 is a exploded view showing the combination of an operation of the present invention.

Referring to FIG. 3 and FIG. 4, for achieving the method described above, the present invention provides an apparatus that attaches on the front of the objective lens 1 of a camera. The apparatus consists of a prepared picture 3 with a central hole 31, and a reflective mirror 5 with a central hole 51. The prepared picture 3 is located within the space between the reflective mirror 5 and the objective lens 1. The reflecting surface 52 of the reflective mirror 5 faces the prepared picture 3 and the objective lens 1, and the optical axis of the reflective mirror 5 substantially coincides with the optical axis of the objective lens. The central hole 51 of the reflective mirror 5 functions as a field stop for defining the shape and size of image area for the image of the subject being photographed. The reflective mirror 5 can be a spherical or non-spherical reflective mirror. The prepared picture 3 is placed between the objective lens 1 and the reflective mirror 5, near the objective lens 1, and substantially orthogonal with respect to the optical axis of the reflective mirror 5 and located substantially at the principal focus of the short axis of the reflective mirror 5. The pattern side of the prepared picture 3 faces the reflecting surface 52 of the reflective mirror 5. The pattern can be a painting, message, data, date or advertisements. The shape of the central hole or the central transparent portion 31 of the prepared picture 3, or the central hole 51 of the reflective mirror 5, can be shaped like a star, circular, square or any desired shape, depending on the user's design requirements. The shapes of the central hole or central transparent portion 31 of the prepared picture 3 and the central hole 51 of the reflective mirror 5 should be the same, and the size of those openings should be substantially the same, or kept in a predetermined proportion. The center of the central hole or the central transparent portion 31 of the prepared picture 3 should be on the common optical axis of the reflective mirror 5 and the objective lens 1. The prepared picture 3 and the reflector frame 7 are positioned on the box frame 6, the reflective mirror 5 is built upon the surface of the reflector frame 7, and the box frame 6 is made of transparent material, by injection molding, for example. The shape of the box frame can have a substantially square contour, be cylindrically, or parallelepiped shaped, a combination thereof or some other shape.

Referring to FIG. 4, the box frame 6 is shown to have a cylindrical upper portion and a diamond rod-shaped lower portion. The bottom portion has a rectangular shape with a rectangular hole 61. Along the edge of the rectangular hole 61 there are a pair of parallel longitudinally directed guide slots 62 and a transversely directed slot 66 at one end of the guide slots 62. The transverse slot 66 has an appropriate number of recesses, two recesses in general, for receiving respective projections 33 of the prepared picture 3 therein. On the upper cylindrical portion there are two opposing notches 63 with an extended slot 64 formed at an edge thereof, so that the slot appears to be L-shaped, and there is a recess formed on the upper side of the extended slot 64.

As shown in FIG. 4, the reflector frame 7, which may be injection molded, appears to have a cylindrical shape with a couple of lugs 71 extending from opposing sides of the edge thereof. A projection 72 is formed on each lug 71. The frame 7 has a concave spherical central portion with a circular hole 51 at the center of the reflector frame 7, the surface of the concave spherical central portion is coated with a reflecting layer to form the reflective mirror 5. The central hole 51 is a part of the concave spherical central portion, which portion is formed in a rectangular region having a certain ratio of length and width, to match that of the film. For example, 35 mm film has a 3:2 ratio, so the ratio of the concave spherical portion would be 3:2 also. The circumferential portion extending out from the edge of the concave spherical central portion, rectangular area, is formed by a flat plate 73, which can be coated with a reflecting layer to form a reflecting surface to improve the brightness of the illumination of the pattern on the prepared picture 3, or appears transparent without a reflecting layer being applied thereto.

In assembling the device, the reflector frame 7 is put into the box frame 6 from the upper side along notches 63 on the edge, keeping the reflective mirror 5 faced toward the inside of the box. Then, the reflector frame 7 is rotated so that the lugs 71 slide into the extended slots 64 and the projections 72 on the lugs 71 lock into the recesses on the extended slots 64 for locating the reflector frame 7 on the box frame 6. To replace the reflector frame 7, the user just needs to turn the frame 7 in a counter-clockwise direction so that the lugs 71 slide out from the extended slots 64 to the notches 63, where the reflector frame can then be lifted out vertically.

The prepared picture 3, as shown on FIG. 4, has an extending tongue 32, and several projections 33 formed on an opposite side of the picture 3 from the tongue 32. In particular, two projections are provided for interlocking with the recesses of the transverse slot 66, as the prepared picture 3 is slid into place along the guide slots 62. When replacing the picture 3, the user just needs to withdraw the old prepared picture 3 and plug in a new one.

Figure 5:
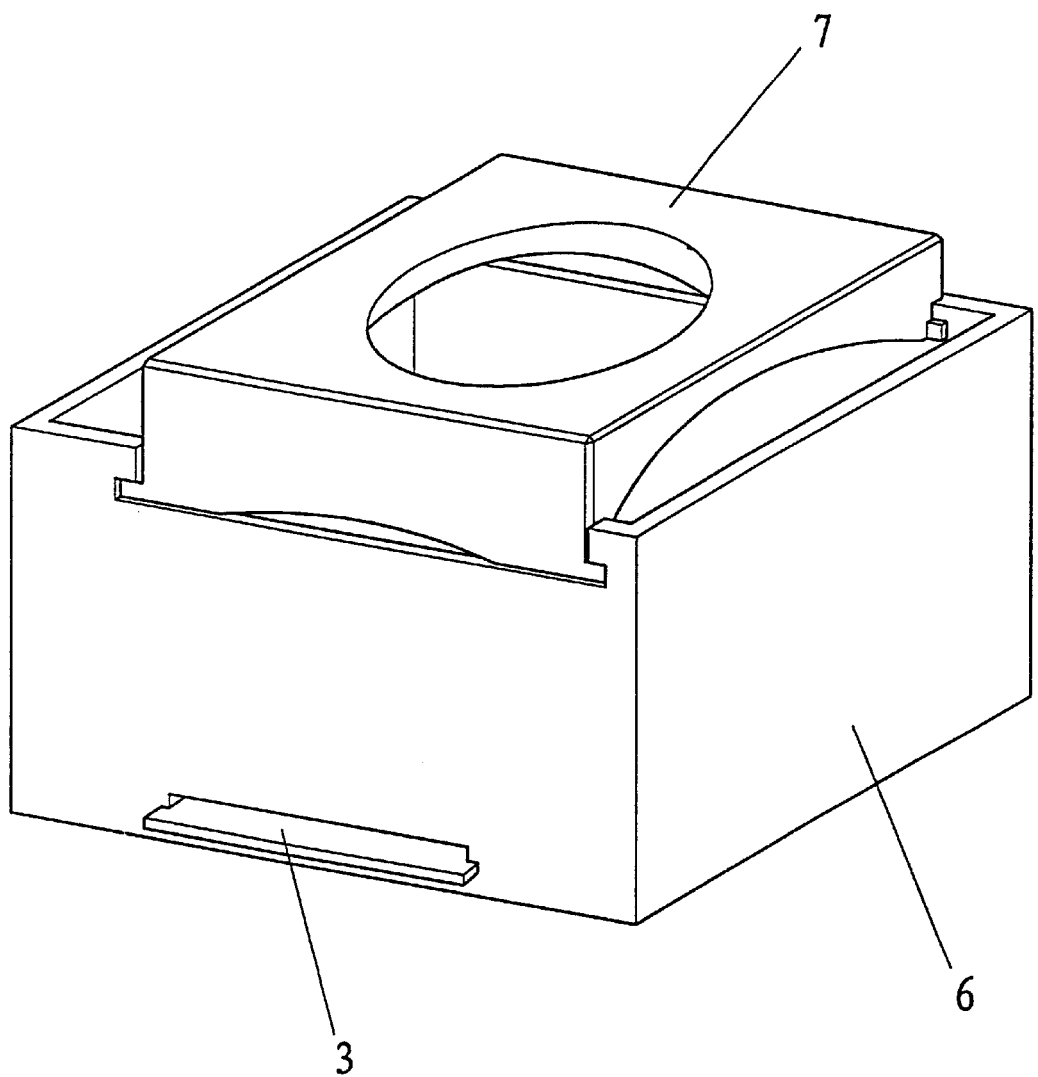
FIG. 5 is a perspective view showing another operation of the present invention.

Referring to FIG. 5, the reflector frame 7 with the reflective mirror 5 is shown to take the form of a rectangular structure fit on a parallelepiped box frame 6.

So, the reflector frame 7 with the reflective mirror 5 and the prepared picture 3 can be removed from the box frame 6 freely, or installed conveniently. Therefore, the manufacturer can produce different patterns and shapes of the central holes or central transparent portions 31 of the prepared pictures and that of the reflector frames 7 to meet the requirements of customers, for replacement of the parts with circularly shaped openings.

Figure 6:
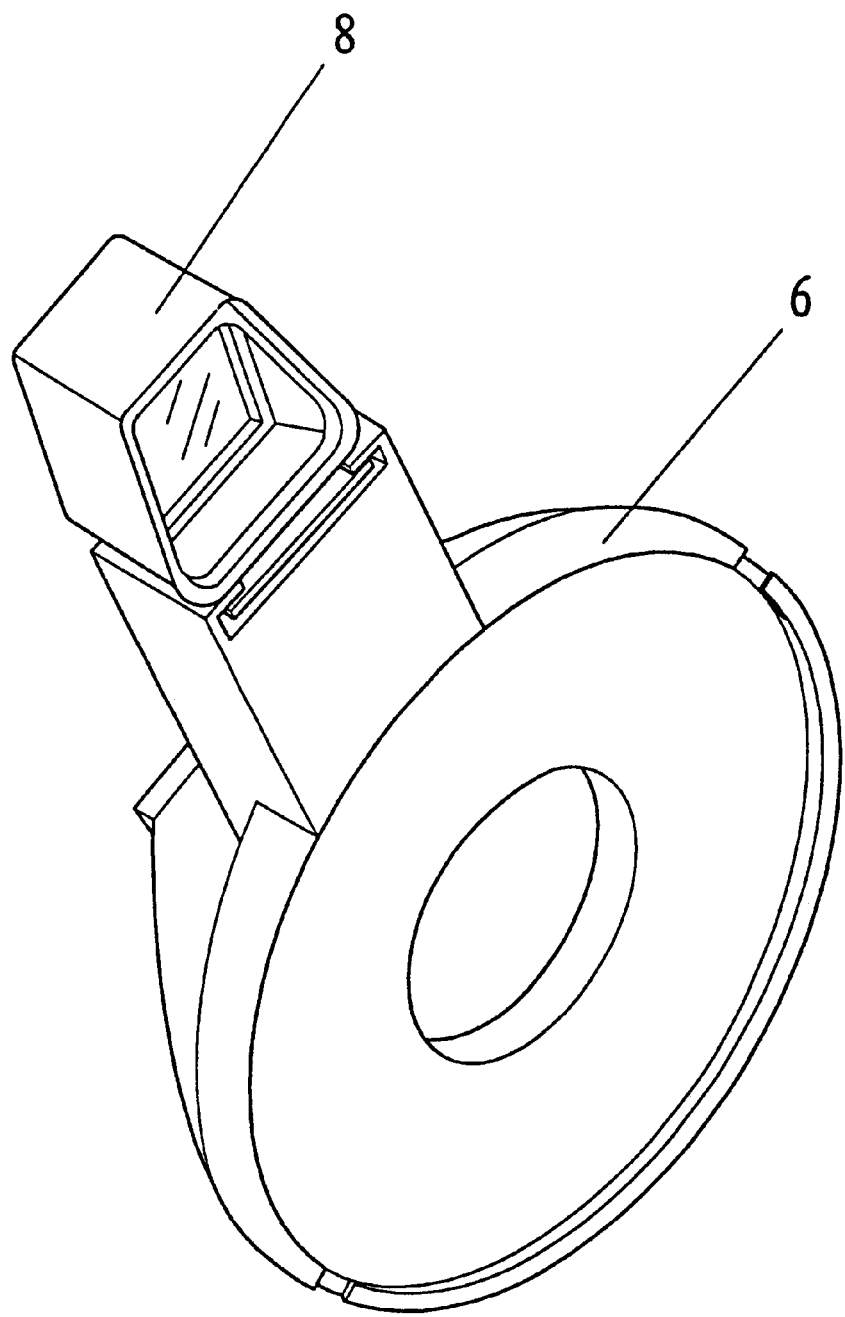
FIG. 6 is a perspective view showing attaching a viewfinder on the present invention.

Referring to FIG. 6, a viewfinder 8 can be attached on the box frame 6 by a sliding fitting on the guide slot of the box frame 6, with a pair of guide rails, for locating it so as to substitute the viewfinder of the camera. Thus, where the attachment of the present invention on some models of cameras renders the camera's viewfinder non-functional, the viewfinder 8 can be secured to the box frame 6 to provide the otherwise lost functionality.

Figure 7:
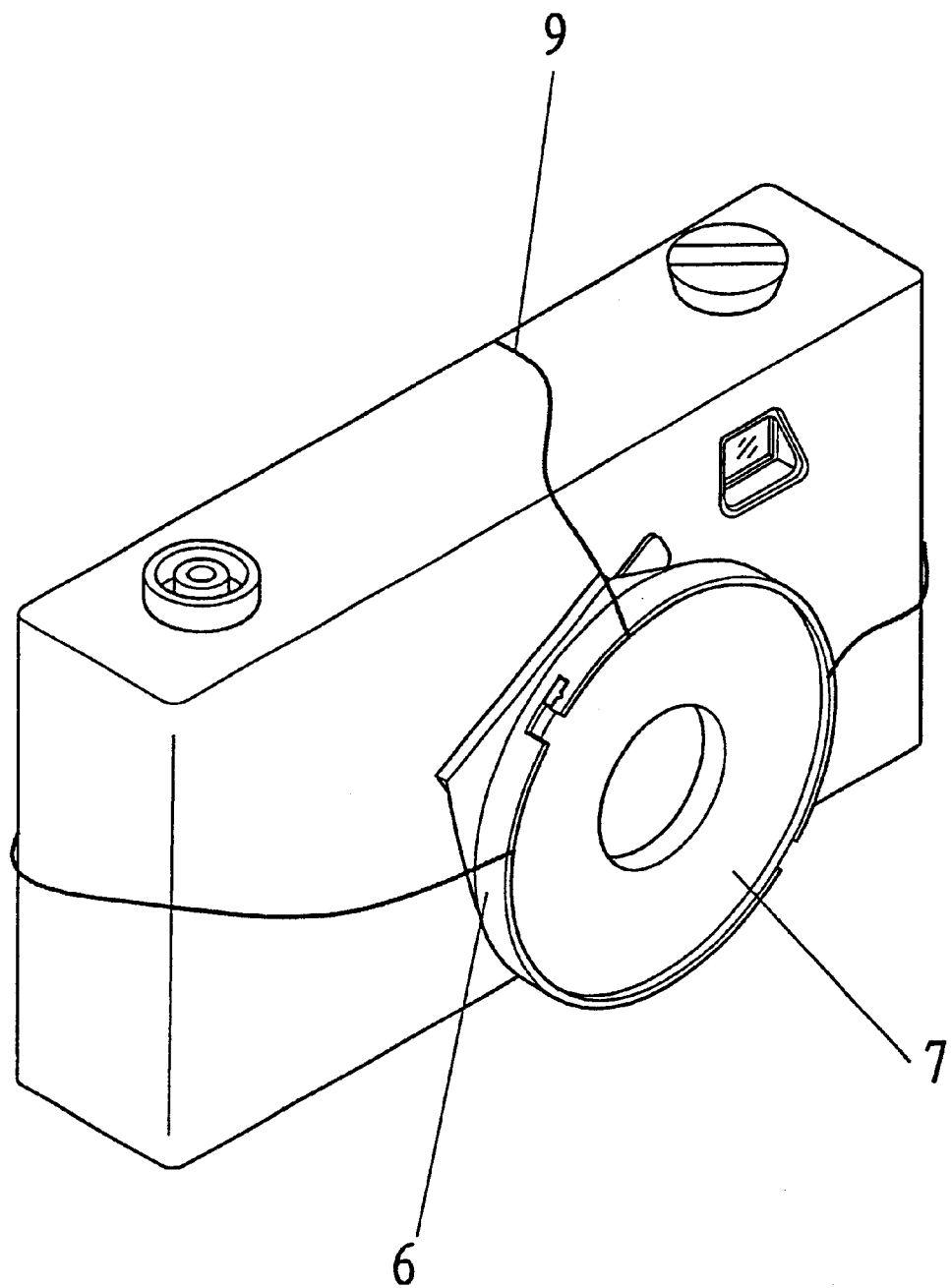
FIG. 7 is a perspective view showing the present invention attaching on a camera.

As shown on FIG. 7, the single-exposure synthesized image apparatus can be fixed on the front of the objective lens 1 of the camera by holding it to the camera with a belt 9, which may be elastic, so that it can be mated to a large variety of cameras.

What is being claimed is:

1. A method for forming a single-exposure synthesized imaging, comprising the steps of:

positioning a prepared picture between an objective lens of a camera and a mirror, the mirror having a reflective surface directed toward the prepared picture;

passing first light rays from a subject being photographed through (a) an aperture in the mirror, and (b) a predefined section of the prepared picture through which light passes, and refracting the first light rays through the objective lens of the camera to form a first image on a portion of a film frame; and, reflecting second light rays from the prepared picture by the reflective surface of the mirror and refracting the second light rays through the objective lens to form a second image on the film frame.

2. The method as claimed in claim 1, wherein the aperture of the mirror is centrally located, said mirror being placed in front of the objective lens, and wherein the predefined section of the prepared picture comprises a central open portion, said prepared picture being located in a space between the objective lens and the mirror, the reflecting surface of the mirror facing the prepared picture and the objective lens; the reflected light rays from the prepared picture being reflected by the mirror to pass through the central open portion of the prepared picture and the objective lens sequentially to form an image of the prepared picture on a circumferential portion of the film frame, the light rays from the subject being passed through the central aperture of the mirror and the central open portion of the prepared picture and the objective lens sequentially to form a subject image on a central portion of the film frame.

3. The method as claimed in claim 2, wherein an optical axis of the mirror coincides with an optical axis of the objective lens, and the prepared picture being located substantially at a principal focus of the mirror and substantially orthogonal to the optical axis of mirror.

4. The method as claimed in claim 1, wherein an optical axis of the mirror coincides with an optical axis of the objective lens, and the prepared picture being located substantially at a principal focus of the mirror and substantially orthogonal to the optical axis of mirror.

5. The method as claimed in claim 1, wherein a center of the predefined section of the prepared picture and the aperture of the mirror lie substantially on an extending line of an optical axis of the objective lens.

6. The method as claimed in claim 2, wherein a center of the central open portion of the prepared picture and the central aperture of the mirror lie substantially on an extending line of an optical axis of the objective lens.

7. An apparatus for forming a single-exposure synthesized image, wherein the apparatus comprises a prepared picture with a central open portion and a mirror with a central aperture; said mirror being placed in front of the prepared picture so that a reflecting surface faces toward the prepared picture and an objective lens of a camera; the prepared picture being located in a space between the objective lens and the mirror; the prepared picture and the mirror being fixed on a box frame.

8. The apparatus as claims in claim 7, wherein an optical axis of the mirror substantially coincides with an optical axis of the objective lens, and the prepared picture is located substantially at a principal focus of the mirror and orthogonal with respect to the optical axis of the mirror.

9. The apparatus as claimed in claim 8, wherein a center of the central open portion of the prepared picture and a center of the central aperture of the mirror are coincident with the optical axis of the objective lens.

10. The apparatus as claimed in claim 7, wherein a center of the central open portion of the prepared picture and a center of the central aperture of the mirror are coincident with an optical axis of the objective lens.

11. The apparatus as claimed in claim 7, wherein a shape of the central open portion of the prepared picture matches that of the central aperture of the mirror, and are in a predetermined relative proportion.

12. The apparatus as claimed in claim 8, wherein a shape of the central open portion of the prepared picture matches that of the central aperture of the mirror, and are in a predetermined relative proportion.

13. The apparatus as claimed in claim 7, wherein the mirror may be a spherical mirror.

14. The apparatus as claimed in claim 7, wherein the mirror may be a non-spherical mirror.

15. The apparatus claimed in claim 7, wherein the mirror comprises a reflecting surface and a circumferential portion extending out from the edge of the reflecting surface; said circumferential portion being a flat reflecting plate.

16. The apparatus as claimed in claim 7, wherein the box frame is made from transparent material.

* * * * *